United States Patent
Zhang et al.

(10) Patent No.: US 10,415,348 B2
(45) Date of Patent: Sep. 17, 2019

(54) MULTI-RIG HYDRAULIC FRACTURING SYSTEM AND METHOD FOR OPTIMIZING OPERATION THEREOF

(71) Applicant: Caterpillar Inc., Peoria, IL (US)

(72) Inventors: Yanchai Zhang, Dunlap, IL (US); Maurice Dust, Edwards, IL (US)

(73) Assignee: Caterpillar Inc., Deerfield, IL (US)

( * ) Notice: Subject to any disclaimer, the term of this patent is extended or adjusted under 35 U.S.C. 154(b) by 192 days.

(21) Appl. No.: 15/584,107

(22) Filed: May 2, 2017

(65) Prior Publication Data

US 2018/0320483 A1 Nov. 8, 2018

(51) Int. Cl.
G05B 13/02 (2006.01)
E21B 41/00 (2006.01)
E21B 43/26 (2006.01)

(52) U.S. Cl.
CPC .......... *E21B 41/0092* (2013.01); *E21B 43/26* (2013.01); *G05B 13/021* (2013.01)

(58) Field of Classification Search
CPC .... E21B 41/0092; E21B 43/26; G05B 13/021
See application file for complete search history.

(56) References Cited

U.S. PATENT DOCUMENTS

| | | | | |
|---|---|---|---|---|
| 7,901,314 | B2* | 3/2011 | Salvaire | F04B 9/02 475/72 |
| 9,324,049 | B2* | 4/2016 | Thomeer | G06Q 10/06316 |
| 2009/0053072 | A1* | 2/2009 | Borgstadt | F04B 15/02 417/17 |
| 2012/0277940 | A1* | 11/2012 | Kumar | B61L 27/0027 701/20 |
| 2013/0259707 | A1* | 10/2013 | Yin | F04B 49/00 417/53 |
| 2013/0290064 | A1 | 10/2013 | Altamirano | |
| 2014/0229120 | A1* | 8/2014 | Luharuka | E21B 43/26 702/34 |
| 2014/0352954 | A1 | 12/2014 | Lakhtychkin | |
| 2016/0194942 | A1 | 7/2016 | Wiegman | |
| 2016/0195082 | A1 | 7/2016 | Wiegman | |
| 2016/0222771 | A1* | 8/2016 | Stephenson | E21B 43/26 |
| 2016/0230512 | A1 | 8/2016 | Stephenson | |
| 2017/0074201 | A1* | 3/2017 | Sujan | F02M 43/00 |
| 2017/0082101 | A1* | 3/2017 | Urdaneta | F04B 51/00 |
| 2017/0322086 | A1* | 11/2017 | Luharuka | G01J 5/0037 |
| 2018/0094517 | A1* | 4/2018 | Foubert | E21B 41/00 |
| 2018/0266217 | A1* | 9/2018 | Funkhouser | G06Q 10/06 |

\* cited by examiner

*Primary Examiner* — Kenneth M Lo
*Assistant Examiner* — Michael J Huntley
(74) *Attorney, Agent, or Firm* — Harrity & Harrity LLP

(57) ABSTRACT

A hydraulic fracturing system comprises a plurality of hydraulic fracturing rigs. Each hydraulic fracturing rig includes an engine, a transmission, and a hydraulic fracturing pump. A driveshaft is coupled between the transmission and the hydraulic fracturing pump to transfer torque from the engine to the hydraulic fracturing pump. The hydraulic fracturing system also includes a fuel consumption data for each hydraulic fracturing rig, and a controller. The controller is programmed to receive a total pump flow and pressure request, and identify a pump flow distribution for each hydraulic fracturing rig of the plurality of hydraulic fracturing rigs based on the total pump flow and pressure request and the fuel consumption data.

20 Claims, 5 Drawing Sheets

US 10,415,348 B2

MULTI-RIG HYDRAULIC FRACTURING SYSTEM AND METHOD FOR OPTIMIZING OPERATION THEREOF

TECHNICAL FIELD

The present disclosure relates generally to a hydraulic fracturing system including a plurality of hydraulic fracturing rigs, and more particularly to a system and method for distributing pump flow among the hydraulic fracturing rigs.

BACKGROUND

Hydraulic fracturing is a means for extracting oil and gas from rock, typically to supplement a horizontal drilling operation. In particular, high pressure fluid is used to fracture the rock, stimulating the flow of oil and gas through the rock to increase the volumes of oil or gas that can be recovered. The system used to inject high pressure fluid, or fracturing fluid, includes, among other components, an engine, transmission, driveshaft and pump. Monitoring and prognostics for all aspects of this system are beneficial to initiate maintenance and reduce unplanned downtown.

U.S. Patent Application Publication No. 2016/0194942 to Wiegman et al. discloses a power management system and method. A pumping system includes at least one pump driven by at least one generator. The power management system receives operating parameters from the pumping system to identify a health index. In response, the power management system modifies an input parameter to the pumping system based on the health index.

As should be appreciated, there is a continuing need to improve efficiency and reliability of the equipment used in hydraulic fracturing.

SUMMARY OF THE INVENTION

In one aspect, a hydraulic fracturing system comprises a plurality of hydraulic fracturing rigs. Each hydraulic fracturing rig includes an engine, a transmission, and a hydraulic fracturing pump. A driveshaft is coupled between the transmission and the hydraulic fracturing pump to transfer torque from the engine to the hydraulic fracturing pump. The hydraulic fracturing system also includes fuel consumption data for each hydraulic fracturing rig, and a controller. The controller is programmed to receive a total pump flow and pressure request, and identify a pump flow distribution for each hydraulic fracturing rig of the plurality of hydraulic fracturing rigs based on the total pump flow and pressure request and the fuel consumption data.

In another aspect, a method for operating a hydraulic fracturing system including a plurality of hydraulic fracturing rigs is provided. The method comprises a step of transferring torque from an engine to a hydraulic fracturing pump using a transmission and a driveshaft at each hydraulic fracturing rig of the plurality of hydraulic fracturing rigs. The method also comprises steps of receiving a total pump flow and pressure request at a controller, and identifying, at the controller, a pump flow distribution for each hydraulic fracturing rig based on the total pump flow and pressure request, fuel consumption data for each hydraulic fracturing rig, and component durability data corresponding to each hydraulic fracturing rig.

In yet another aspect, a control system for a hydraulic fracturing system including a plurality of hydraulic fracturing rigs comprises fuel consumption data for each hydraulic fracturing rig, and a controller. The controller is programmed to receive a total pump flow and pressure request, and identify a pump flow distribution for each hydraulic fracturing rig of the plurality of hydraulic fracturing rigs based on the total pump flow and pressure request and the fuel consumption data.

DETAILED DESCRIPTION

Figure 1:
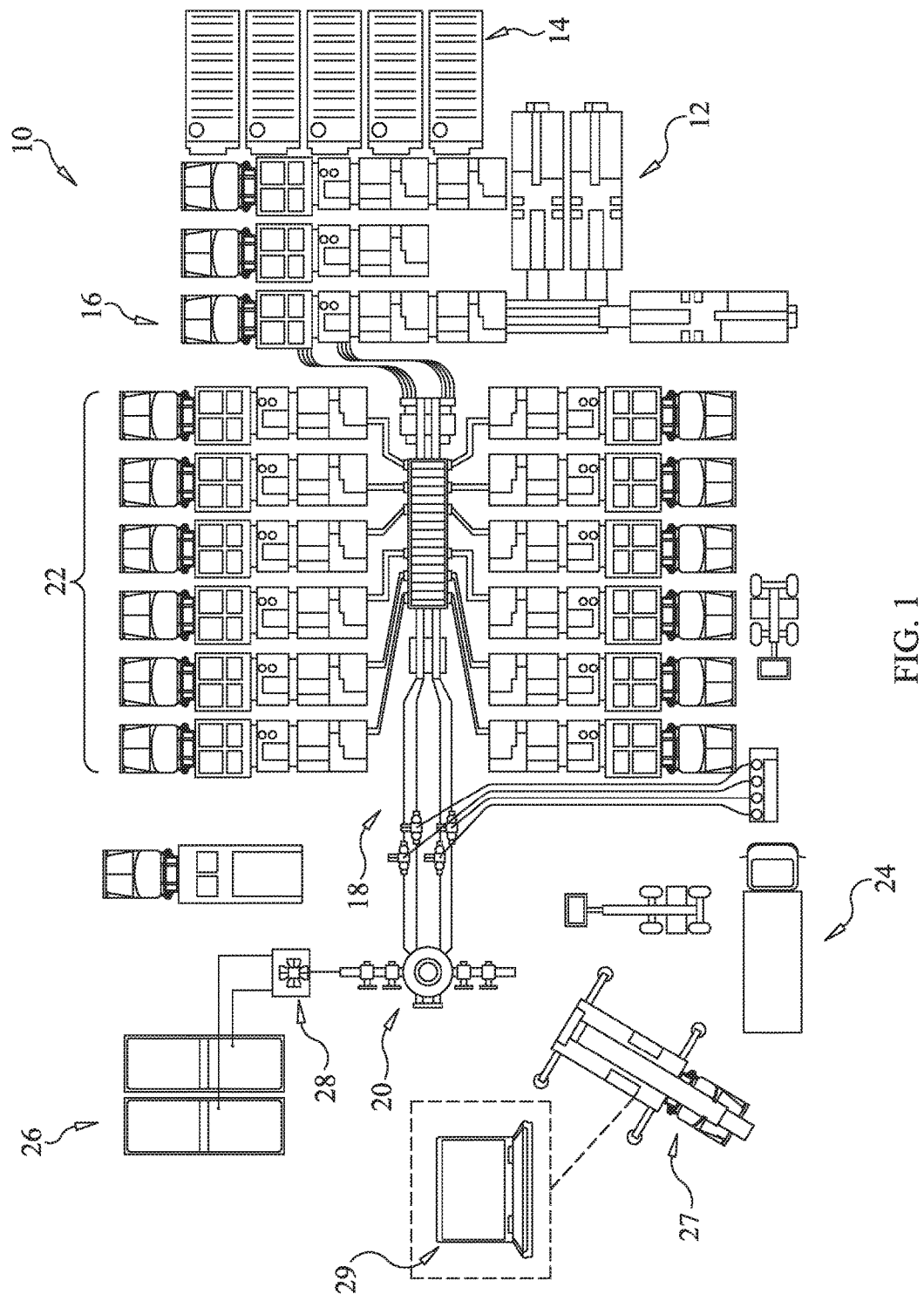
FIG. 1 is a schematic diagram of an exemplary hydraulic fracturing system including a plurality of hydraulic fracturing rigs, according to an aspect of the present disclosure.

An exemplary hydraulic fracturing system 10 according to the present disclosure is shown in FIG. 1. In particular, FIG. 1 depicts an exemplary site layout according to a well stimulation stage (i.e., hydraulic fracturing stage) of a drilling/mining process, such as after a well has been drilled at the site and the equipment used for drilling removed. The hydraulic fracturing system 10 may include a fluid storage tank 12, a sand storage tank 14 and blending equipment 16 for preparing a fracturing fluid. The fracturing fluid, which may, for example, include water, sand, and one or more chemicals, may be injected at high pressure through one or more fluid lines 18 to a well head 20 using a plurality of hydraulic fracturing rigs 22.

A bleed off tank 24 may be provided to receive bleed off liquid or gas from the fluid lines 18, as is known to those skilled in the art. In addition, and according to some embodiments, nitrogen, which may be beneficial to the hydraulic fracturing process for a variety of reasons, may be stored in tanks 26, with a pumping system 28 used to supply the nitrogen from the tanks 26 to the fluid lines 18 or well head 20.

The hydraulic fracturing process performed at the site, using the hydraulic fracturing system 10 of the present disclosure, and the equipment used in the process, may be managed and/or monitored from a single location, such as a data monitoring system 27, located at the site or at additional or alternative locations. According to an example, the data monitoring system 27 may be supported on a van, truck or may be otherwise mobile. As will be disclosed below, the data monitoring system 27 may include a display 29 for displaying data for monitoring performance and/or optimizing operation of the hydraulic fracturing system 10 and/or hydraulic fracturing rigs 22. According to one embodiment, the data gathered by the data monitoring system 27 may be sent off-board or off-site for monitoring performance and/or performing calculations relative to the hydraulic fracturing system 10.

Figure 2:
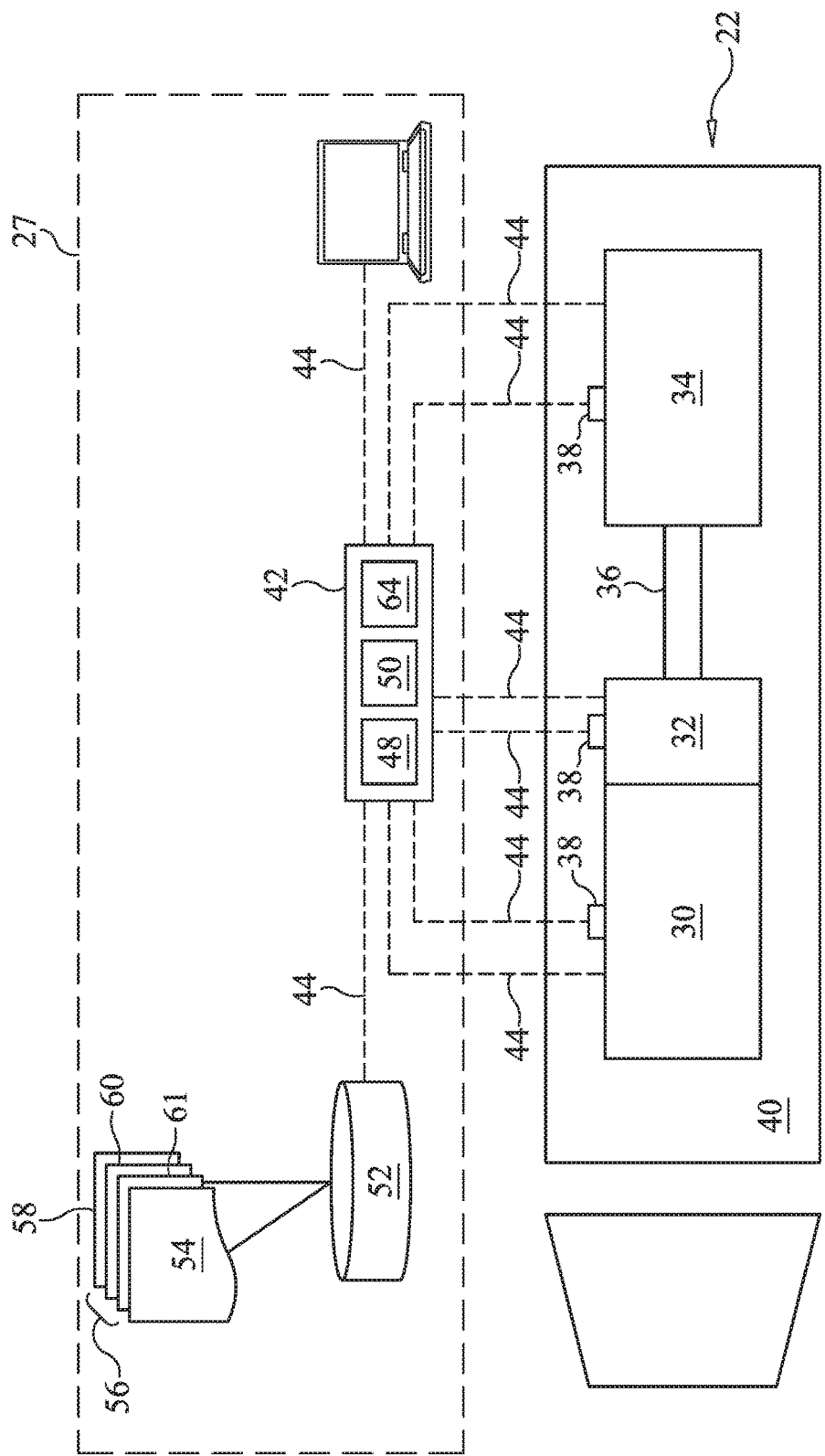
FIG. 2 is a schematic diagram of a hydraulic fracturing rig of the hydraulic fracturing system of FIG. 1, according to an aspect of the present disclosure.

Turning now to FIG. 2, the plurality of hydraulic fracturing rigs 22, according to the present disclosure, may each generally include an engine 30, or other source of power, a transmission 32, and a hydraulic fracturing pump 34. A driveshaft 36 may be coupled between the transmission 32 and the hydraulic fracturing pump 34 for transferring torque from the engine 30 to the hydraulic fracturing pump 34. One or more sensors 38 may be positioned and configured to detect or measure one or more physical properties related to operation and/or performance of the various components of the hydraulic fracturing rig 22. The hydraulic fracturing rig 22 may be mobile, such as supported on a tractor-trailer 40, so that it may be more easily transported from site to site. Each of the hydraulic fracturing rigs 22 may or may not have similar configurations.

At least one controller 42, including a processor 48 and memory 50, may be provided, and may be part of, or may communicate with, the data monitoring system 27. The controller 42 may reside in whole or in part at the data monitoring system 27, or elsewhere relative to the hydraulic fracturing system 10. Further, the controller 42 may be configured to communicate with the sensors 38 and/or various other systems or devices via wired and/or wireless communication lines 44, using available communication schemes, to monitor and control various aspects of each hydraulic fracturing rig 22 and/or each respective engine 30, transmission 32, and hydraulic fracturing pump 34. It should be appreciated that there may be one or more controllers positioned at or supported on each hydraulic fracturing rig 22, and one or more controllers configured for coordinating control of the overall hydraulic fracturing system 10.

According to the present disclosure, the controller 42, including additional or alternative controllers, may be configured to execute an optimization program 64. The optimization program 64 may receive a total pump flow and pressure request for the hydraulic fracturing system 10, or site, and may utilize fuel consumption data 54 and/or component durability data 56, which may be stored in memory, such as non-transitory memory, 50 or may be otherwise provided, to identify a pump flow distribution for each hydraulic fracturing rig 22, as described below. According to the exemplary embodiment, the component durability data 56 may include transmission gear life prediction data, pump cavitation prediction data 60, pump life prediction data 61, and engine life prediction, to name a few. However, various other additional or alternative durability data may be used. Various data utilized by the controller 42 may be stored in a database 52, for example, which may be located on-site or at a remote location.

Figure 3:
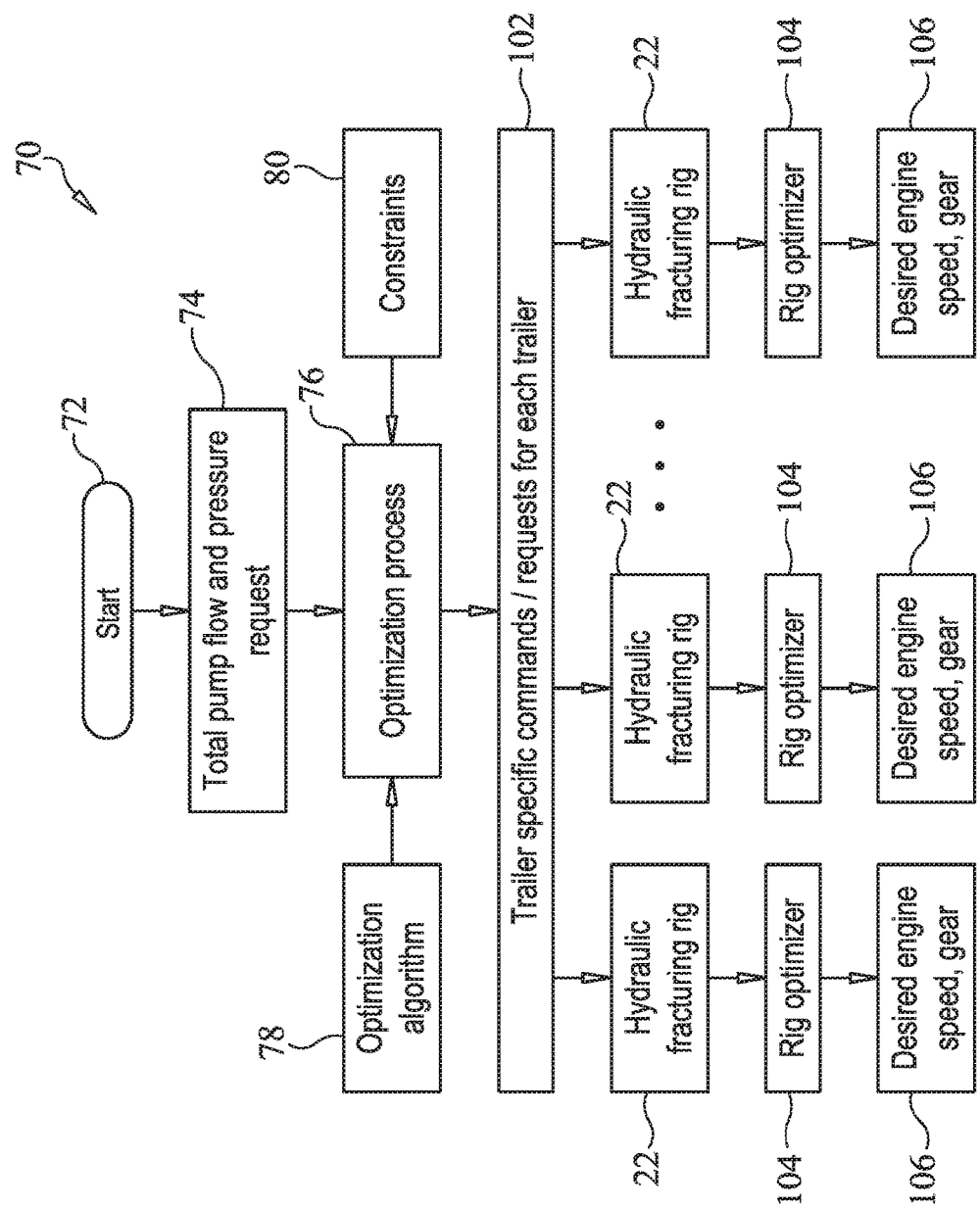
FIG. 3 is a schematic diagram of an exemplary method of optimizing operation of the hydraulic fracturing system of FIG. 1, according to an aspect of the present disclosure.

A method of operating the hydraulic fracturing system 10 or, more particularly, optimizing operation of the hydraulic fracturing system 10, may include execution of the optimization program 64, which is illustrated using a schematic 70 in FIG. 3. The method may be implemented in whole or in part by the controller 42, with all or portions of the method running continuously or intermittently, such as at predetermined intervals. The method begins at a start, box 72, and proceeds to box 74, at which a total pump flow and pressure request is received. The total pump flow and pressure request for the hydraulic fracturing system 10 may be provided as inputs to an optimization process, at box 76. Additional inputs to the optimization process may include an optimization algorithm, at box 78, and various constraints, at box 80.

Figure 4:
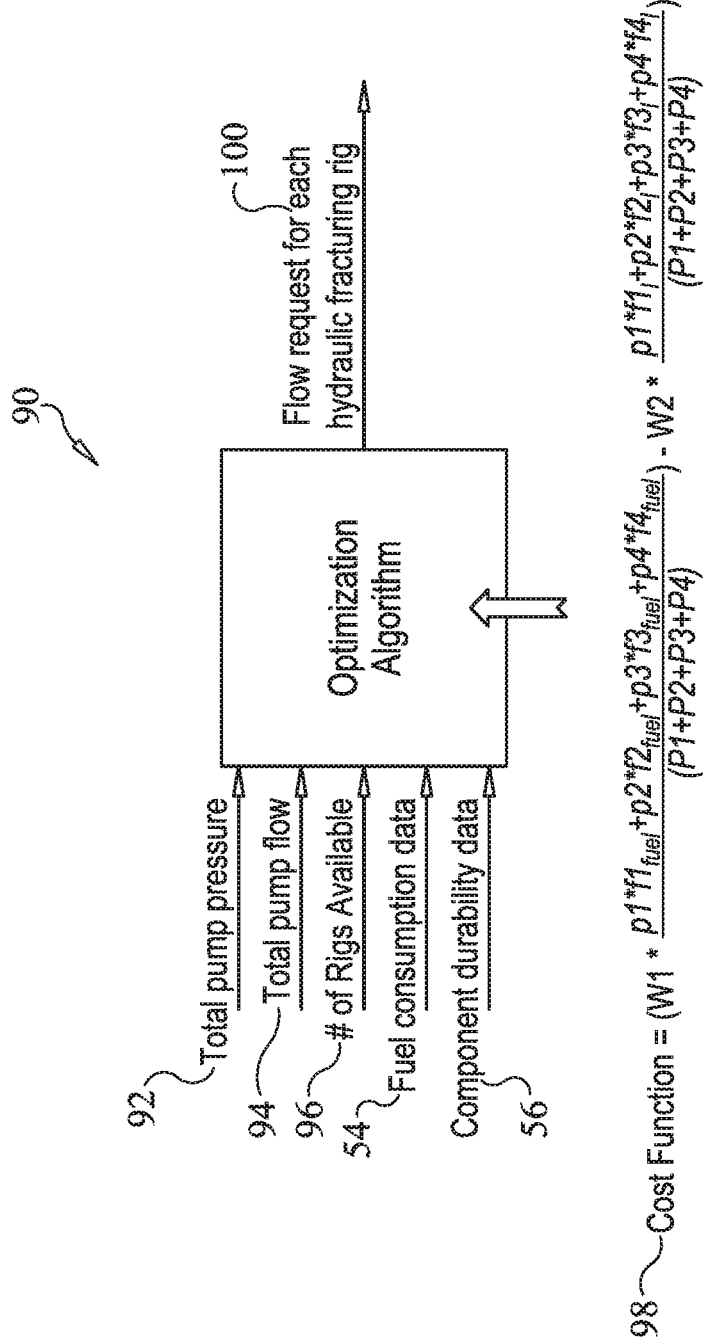
FIG. 4 is a diagram illustrating an exemplary optimization algorithm for use with the method depicted in FIG. 3.

An exemplary optimization algorithm is illustrated at 90 in FIG. 4. The optimization algorithm 90 may receive a request for a total pump pressure 92 and a total pump flow 94, based on the total pump flow and pressure request, at box 74 of FIG. 3. The optimization algorithm 90 may also access or receive fuel consumption data 54, component durability data 56, and a number of rigs available 96 for the hydraulic fracturing system 10. The number of rigs available 96 may be generated manually or automatically, and may represent the number of hydraulic fracturing rigs 22 operational and/or available for use at the site.

The fuel consumption data 54 may include one or more brake specific fuel consumption (BSFC) maps. BSFC maps are known, and analyze the fuel efficiency of an engine and generally represent the rate of fuel consumption divided by the power produced. Alternatively, or additionally, the fuel consumption data 54 may include data received from each hydraulic fracturing rig 22. That is, the sensor(s) 38 of each hydraulic fracturing rig 22 may include a fuel meter for measuring fuel consumption at the hydraulic fracturing rigs 22. The fuel meter measurements may be transmitted from the hydraulic fracturing rigs 22 to the controller 42 via communication lines 44.

According to the exemplary embodiment, the component durability data 56 may include one or more of transmission gear life prediction data 58, pump cavitation prediction data 60, and pump life prediction data 61. However, various other durability data may also be used. Transmission gear life prediction data 58, for example, may include mappings of timeframes to usage hours for transmission gears. For example, gears that are utilized more than others may wear at a faster rate and, thus, may have a shorter life prediction than other gears. For transmission gears, and/or other transmission components, the optimization algorithm 90 may use various transmission gear life prediction data 58, or other data, to avoid operation that may lead to premature damage or failure, and extend the life of the transmission gears, or other components, of the hydraulic fracturing rig 22. Overall life prediction data for the hydraulic fracturing rig 22, including life prediction data for any or all of the engine 30, transmission 32, and hydraulic fracturing pump 34, may also be used by the optimization algorithm 90.

Pump cavitation prediction data 60 may also be referenced to ensure that the pump flow and pressure settings do not correspond to a potential pump cavitation event. The pump cavitation prediction data 60, for example, may include mappings of pump speeds to inlet pressure values that indicate operating parameters in which a pump cavitation event has occurred or is likely to occur. Pump life prediction data 61 may include mappings of timeframes to usage hours for pumps. The pump cavitation prediction data 60 and the pump life prediction data 61 may be used by the optimization algorithm 90 to avoid operation that may lead to premature damage or failure of the pumps or various components of the pumps.

Modifications and/or customizations may be made to the optimization strategy of the present disclosure without deviating from the intended scope. For example, factors in addition to fuel economy and durability may be used to determine pump flow distribution for the plurality of hydraulic fracturing rigs 22. Also, various other durability data, including durability data for engine components, may be provided as component durability data 56 to the optimization algorithm 90. Further, a weight factor may be applied to fuel economy, durability data, and/or other factors to arrive at an appropriate balance.

The algorithm 90 may receive the various inputs just described, including total pump pressure 92, total pump flow 94, number of rigs available 96, fuel consumption data 54, and component durability data 56, and utilize, or perform, a cost function 98 to arrive at pump flow distributions 100 for the hydraulic fracturing rigs 22. According to the exemplary embodiment, the cost function 98 may take ((power*fuel efficiency for each engine) divided by (total power) and multiply that by a (first weight factor)) and subtract from that ((power*life prediction for each engine, or rig) divided by (total power) and multiply that by a (second weight factor). Power, as used here, equals (pressure*flow). Since pressure is constant, the equation will solve for "flow" for each hydraulic fracturing rig 22. The cost function 98 may target to minimize fuel cost and maximize life, or durability, of components. The first and second weight factors may be adjustable. For example, weighting could be 80% fuel economy and 20% durability, or 100% fuel economy and 0% durability, or 0% fuel economy and 100% durability.

Returning to FIG. 3, the optimization process, at box 76, may transmit the pump flow distributions 100, along with other data or commands, to the hydraulic fracturing rigs 22, at 102. Each of the hydraulic fracturing rigs 22 may also have a rig optimizer, at box 104, for optimizing operation at the rig-level. For example, the local optimization process, and assigned flow distribution, may be used to further optimize operation and arrive at desired engine speed and gear, at box 106. However, regardless of whether or not an optimizer process is executed at the rig-level, the specific flow distribution assigned to the hydraulic fracturing rig 22 will be used to set or control operating parameters, at box 106, of the components of the hydraulic fracturing rig 22.

INDUSTRIAL APPLICABILITY

The present disclosure relates generally to a hydraulic fracturing system including a plurality of hydraulic fracturing rigs. More particularly, the present disclosure relates to optimizing operation of the hydraulic fracturing system. Yet further, the present disclosure is applicable to a system and method for distributing pump flow among the hydraulic fracturing rigs.

Referring generally to FIGS. 1-5, a hydraulic fracturing system 10 includes a plurality of hydraulic fracturing rigs 22. Each hydraulic fracturing rig 22 may generally include an engine 30, a transmission 32, and a hydraulic fracturing pump 34. A driveshaft 36 may be coupled between the transmission 32 and the hydraulic fracturing pump 34 for transferring torque from the engine 30 to the hydraulic fracturing pump 34. One or more sensors 38 may be positioned and configured to detect or measure one or more physical properties related to operation and/or performance of the various components of the hydraulic fracturing rig 22.

At least one controller 42, including a processor 48 and memory 50, may be provided, and may be part of, or may communicate with, a site-level control system, such as, for example, a data monitoring system 27. The controller 42 may reside in whole or in part at the data monitoring system 27, or elsewhere relative to the hydraulic fracturing system 10. Further, the controller 42 may be configured to communicate with the sensors 38 and/or various other systems or devices via wired and/or wireless communication lines 44, using available communication schemes, to monitor and control various aspects of each hydraulic fracturing rig 22 and/or each respective engine 30, transmission 32, and hydraulic fracturing pump 34.

Figure 5:
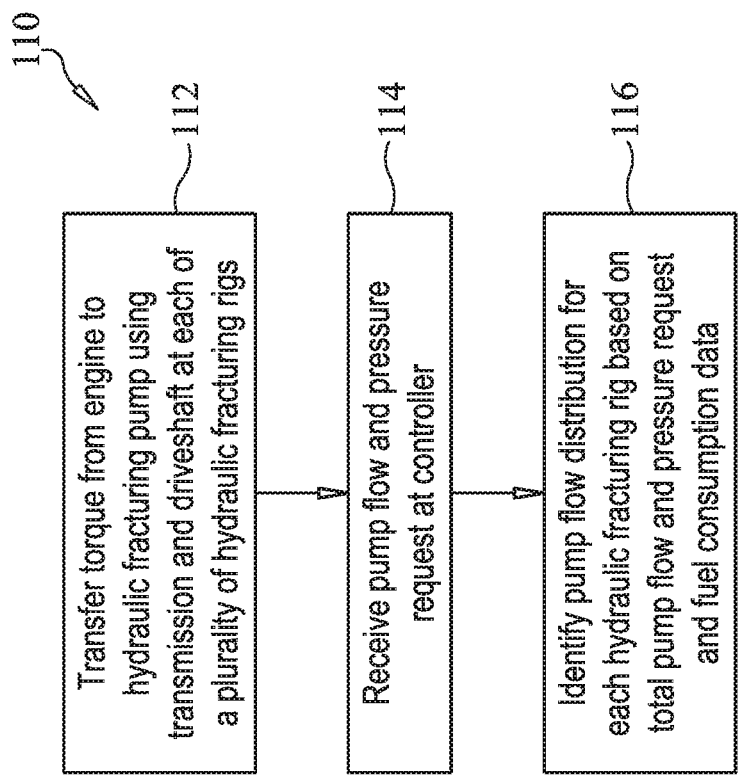
FIG. 5 is a flow diagram of the primary steps of the method of optimizing operation of the hydraulic fracturing system of present disclosure.

According to the present disclosure, the controller 42 may be configured to execute an optimization program 64, the primary steps of which are illustrated in a flow diagram 110 of FIG. 5. During operation of each hydraulic fracturing rig 22, torque is transferred from the engine 30 to the hydraulic fracturing pump 34 using the transmission 32 and the driveshaft 36, at box 112 of FIG. 5. At box 114, the optimization program 64 receives a total pump flow and pressure request for the hydraulic fracturing system 10. The controller 42 then uses the total pump flow and pressure request, fuel consumption data 54, and/or component durability data 56 to identify pump flow distributions for the hydraulic fracturing rigs 22, at box 116. The pump flow distributions may be displayed on the display 29 of the data monitoring system 27, for example, printed out as a report, or otherwise communicated to the operator. The pump flow for each hydraulic fracturing rig 22 may then be controlled manually. Alternatively, the pump flow distributions may be conveyed to each respective hydraulic fracturing rig 22 for automatic electronic control thereof, as is known to those skilled in the art.

Thus, the system and method of the present disclosure identifies a flow distribution for each hydraulic fracturing rig 22 to optimize operation, rather than equally distributing required flow among each hydraulic fracturing rig 22 as is done in conventional applications. In addition to fuel economy, the disclosed optimization strategy considers durability of various components of the hydraulic fracturing system 10, including hydraulic fracturing rigs 22. As such, the optimization strategy provides a means for operating the hydraulic fracturing system 10 in a more fuel-efficient manner, while also avoiding operation that may lead to premature damage or failure, and extending the life of the components of the hydraulic fracturing system 10.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A hydraulic fracturing system, comprising:
a plurality of hydraulic fracturing rigs,
wherein a hydraulic fracturing rig, of the plurality of hydraulic fracturing rigs, includes:
an engine,
a transmission,
a hydraulic fracturing pump, and
a driveshaft coupled between the transmission and the hydraulic fracturing pump to transfer torque from the engine to the hydraulic fracturing pump;
a memory configured to store fuel consumption data for the hydraulic fracturing rig; and
a controller programmed to:
receive a total pump flow and pressure request;
identify a pump flow distribution for the hydraulic fracturing rig based on the total pump flow and pressure request, the fuel consumption data, component durability data, and one or more weight factors associated with fuel economy and component durability; and
provide information regarding the pump flow distribution to the hydraulic fracturing rig,
wherein the information regarding the pump flow distribution is utilized to control the hydraulic fracturing rig.

2. The hydraulic fracturing system of claim 1, wherein the component durability data includes at least one of durability data for a transmission component or durability data for a pump component.

3. The hydraulic fracturing system of claim 1, wherein the component durability data includes transmission gear life prediction data.

4. The hydraulic fracturing system of claim 1, wherein the component durability data includes pump cavitation prediction data.

5. The hydraulic fracturing system of claim 1, wherein the component durability data includes pump life prediction data.

6. The hydraulic fracturing system of claim 1, wherein the fuel consumption data corresponds to the hydraulic fracturing rig.

7. The hydraulic fracturing system of claim 1, further including:
    at least one sensor, positioned at the hydraulic fracturing rig, configured to measure one or more physical properties related to an operation of the hydraulic fracturing rig.

8. The hydraulic fracturing system of claim 1, wherein the hydraulic fracturing rig includes a fuel meter configured to:
    generate the fuel consumption data; and
    transmit the fuel consumption data to the controller.

9. The hydraulic fracturing system of claim 1, wherein the one or more weight factors include a weight factor associated with a fuel efficiency for the engine.

10. The hydraulic fracturing system of claim 1, wherein the one or more weight factors include a weight factor associated with a life prediction for the engine.

11. A method for operating a hydraulic fracturing system including a plurality of hydraulic fracturing rigs, the method comprising:
    transferring torque from an engine to a hydraulic fracturing pump using a transmission and a driveshaft at a hydraulic fracturing rig of the plurality of hydraulic fracturing rigs;
    receiving, by a controller, a total pump flow and pressure request;
    identifying, by the controller, a pump flow distribution for the hydraulic fracturing rig based on the total pump flow and pressure request, fuel consumption data, component durability data, and one or more weight factors associated with fuel economy and component durability; and
    providing, by the controller, information regarding the pump flow distribution to the hydraulic fracturing rig, wherein the information regarding the pump flow distribution is utilized to control the hydraulic fracturing rig.

12. The method of claim 11, wherein the component durability data includes transmission gear life prediction data.

13. The method of claim 11, wherein the component durability data includes durability data for a pump component.

14. The method of claim 11, further comprising:
    generating the fuel consumption data at the hydraulic fracturing rig; and
    transmitting the fuel consumption data to the controller.

15. The method of claim 11, wherein the one or more weight factors include:
    a first weight factor associated with a fuel efficiency for the engine, and
    a second weight factor associated with a life prediction for the engine.

16. A control system for a hydraulic fracturing system including a plurality of hydraulic fracturing rigs, the control system comprising:
    a memory; and
    a controller programmed to:
        receive a total pump flow and pressure request;
        identify a pump flow distribution for a hydraulic fracturing rig of the plurality of hydraulic fracturing rigs based on the total pump flow and pressure request, fuel consumption data, component durability data, and one or more weight factors associated with fuel economy and component durability; and
        provide information regarding the pump flow distribution to the hydraulic fracturing rig,
            wherein the information regarding the pump flow distribution is utilized to control the hydraulic fracturing rig.

17. The control system of claim 16, wherein the component durability data includes durability data for a pump component.

18. The control system of claim 16, wherein the one or more weight factors include a first weight factor and a second weight factor.

19. The control system of claim 18, wherein, when identifying the pump flow distribution, the controller is programmed to:
    determine a first value based on the first weight factor and a fuel efficiency for an engine of the hydraulic fracturing rig, and
    determine a second value based on the second weight factor and a life prediction for the engine, and
    identify a pump flow distribution for a hydraulic fracturing rig of the plurality of hydraulic fracturing rigs based on the total pump flow and pressure request, the fuel consumption data, the component durability data, the first value, and the second value.

20. The control system of claim 16, wherein the component durability data includes transmission gear life prediction data.

* * * * *